(12) United States Patent
Gormley et al.

(10) Patent No.: US 9,392,477 B2
(45) Date of Patent: Jul. 12, 2016

(54) NEIGHBOR CELL INTERFERENCE ESTIMATION

(71) Applicant: Eden Rock Communications, LLC, Bothell, WA (US)

(72) Inventors: Eamonn Gormley, Bothell, WA (US); Adrian Yip, Bothell, WA (US)

(73) Assignee: Nokia Solutions and Networks OY, Espoo (FI)

( * ) Notice: Subject to any disclaimer, the term of this patent is extended or adjusted under 35 U.S.C. 154(b) by 114 days.

(21) Appl. No.: 13/918,743

(22) Filed: Jun. 14, 2013

(65) Prior Publication Data

US 2013/0337800 A1    Dec. 19, 2013

Related U.S. Application Data

(60) Provisional application No. 61/659,895, filed on Jun. 14, 2012.

(51) Int. Cl.
*H04B 17/00* (2015.01)
*H04W 24/08* (2009.01)
*H04W 36/00* (2009.01)
*H04W 72/08* (2009.01)

(52) U.S. Cl.
CPC .......... *H04W 24/08* (2013.01); *H04W 36/0061* (2013.01); *H04W 72/082* (2013.01); *H04W 72/08* (2013.01)

(58) Field of Classification Search
CPC ..... H04W 24/08; H04W 24/00; H04W 24/10; H04W 36/20; H04W 40/16; H04W 52/24; H04W 72/082; H04W 36/0061; H04W 72/08; H04W 16/10; H04W 72/0413; H04W 72/1231; H04W 72/04; H04W 72/042; H04W 24/02; H04W 72/0453; H04W 52/244
USPC ............. 455/436, 403, 422.1, 450, 553.1, 73, 455/550, 63.1, 67.13, 452.1, 452.2, 501; 370/335, 310, 328, 329, 330, 441, 431, 370/331
See application file for complete search history.

(56) References Cited

U.S. PATENT DOCUMENTS

| | | | | |
|---|---|---|---|---|
| 8,913,554 | B2* | 12/2014 | Aguirre et al. | 370/328 |
| 2006/0217067 | A1* | 9/2006 | Helbig | H04W 16/14 455/63.1 |
| 2008/0176519 | A1* | 7/2008 | Kwak | H04L 1/20 455/67.13 |
| 2009/0197588 | A1* | 8/2009 | Khandekar et al. | 455/422.1 |
| 2010/0067627 | A1* | 3/2010 | Lincoln | H04L 1/20 375/346 |
| 2012/0115469 | A1* | 5/2012 | Chen et al. | 455/434 |
| 2013/0094385 | A1* | 4/2013 | Gunnarsson et al. | 370/252 |

* cited by examiner

*Primary Examiner* — Olumide T Ajibade Akonai (57) ABSTRACT

A system for estimating interference on a cellular network includes a processor and a non-transitory computer readable medium with computer executable instructions stored thereon. The computer executable instructions perform the following method when executed by the processor: causing the processor to receive from a user equipment, first information indicating a strength of a signal received at the user equipment from an interfering base station; causing the processor to receive second information indicating an airlink utilization of the interfering base station; and causing the processor to process the first information and the second information according to an estimation function to produce an interference estimate.

21 Claims, 9 Drawing Sheets

NEIGHBOR CELL INTERFERENCE ESTIMATION

CROSS-REFERENCES TO RELATED APPLICATIONS

The present invention claims priority to and is a non-provisional of U.S. Application No. 61/659,895, filed Jun. 14, 2012. That application is herein incorporated by reference for all purposes.

BACKGROUND

A cellular radio network typically comprises multiple cellular base stations and mobile devices. Each of the mobile devices is in radio communication with one of the cellular base stations, known as its serving base station. At the same time, radio signals from other base stations in the network can cause interference with the signals that each mobile device is receiving from its serving base station.

Accordingly, there is a need for apparatuses and methods for performing neighbor cell interference estimation.

SUMMARY

Embodiments relate to estimating the levels of interference that a mobile device receives from neighboring base stations. The mobile device reports to its serving base station, the received power levels of reference signals received from the interfering base station. The interfering base station airlink utilization is also sent to the serving base station. In some embodiments, this utilization information is shared using a central controller. In certain embodiments this utilization information is directly exchanged by the base stations. The serving base station produces an estimated interference from the power level and the utilization information. The estimated interference may also be determined based upon alternative mapping functions, for example as may be derived from link or network simulations.

In an embodiment, a system for estimating interference on a cellular network includes a processor; and a non-transitory computer readable medium with computer executable instructions stored thereon. The computer executable instructions perform the following method when executed by the processor: causing the processor to receive from a user equipment, first information indicating a strength of a signal received at the user equipment from an interfering base station; causing the processor to receive second information indicating an airlink utilization of the interfering base station; and causing the processor to process the first information and the second information according to an estimation function to produce an interference estimate.

In another embodiment, a non-transitory computer readable medium with computer executable instructions stored thereon which, when executed by the processor, perform the following method: receiving from a user equipment, first information indicating a strength of a signal received at the user equipment from an interfering base station; receiving second information indicating an airlink utilization of the interfering base station; and processing the first information and the second information according to an estimation function to produce an interference estimate

DESCRIPTION

A system and method according to embodiments of the present invention may implement various aspects of interference estimation. The aspects may include a mobile device reporting to its serving base station, the received power levels of reference signals received from the interfering base station. The interfering base station airlink utilization is also sent to the serving base station. The serving base station determines an equivalent interference level using these pieces of information.

The following description is an example of how various aspects of the present invention may be implemented. In the example, a serving base station acquires the airlink channel utilization of neighboring base stations, and the serving and interference base station reference signal power measurements. The reference signal power can be measured by a mobile device and provided directly to the serving base station, via a central controller, or other methods. On the basis of these pieces of information, the serving base station can determine an effective interference level from the neighbor base stations according to a function. As discussed in detail below, one function that calculates an effective interference level, multiplies the reference interference signal power by a function of the interfering base station airlink utilization.

Figure 1:
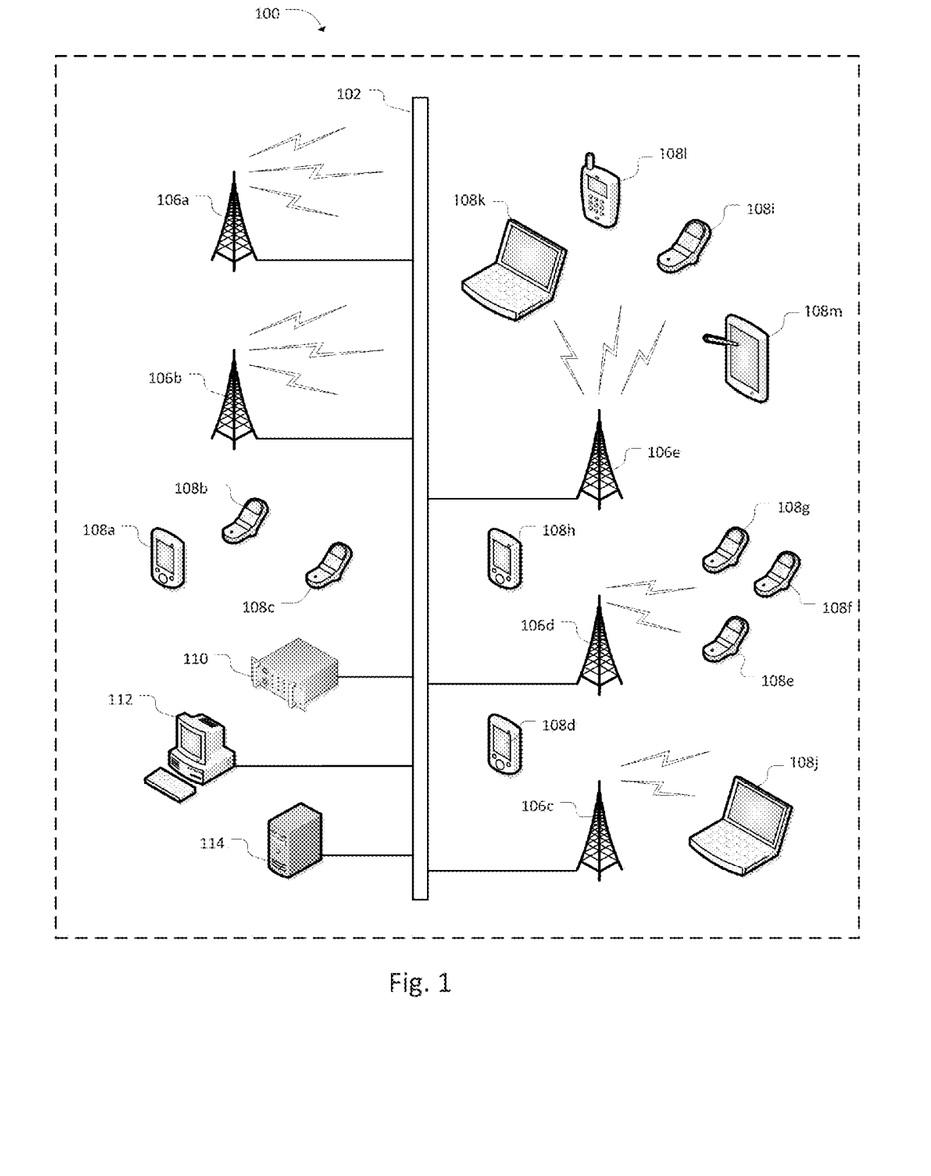
FIG. 1 illustrates a networked computing system according to an embodiment of the present invention.

FIG. 1 illustrates a wireless network system 100 according to an embodiment of the present invention. As depicted, system 100 may include a data communications network 102, one or more network base stations 106a-e each of which have one or more base station antenna, one or more network controller devices 110a-c, and one or more User Equipment (UE) 108a-m.

In system 100, the data communications network 102 may include a backhaul portion that can facilitate distributed network communications between any of the network controller devices 110, 112, and 114 and any of the network base stations 106a-e. Any of the network controller devices 110-114 may be Network Resource Controllers (NRCs) or have NRC functionality. Any of the network base stations 106a-e may be NRCs or have NRC functionality and may share overlapping wireless coverage with one or more neighboring base stations within a particular region of the networked computing system 100. The one or more UE 108a-m may include cell phone/PDA devices 108a-i, laptop/netbook computers 108j-k, handheld gaming units 108l, electronic book devices or tablet PCs 108m, and any other type of common portable wireless computing device that may be provided with wireless communications service by any of the network base stations 106a-e.

As would be understood by those skilled in the Art, in most digital communications networks, the backhaul portion of a data communications network 102 may include intermediate links between a backbone of the network which are generally wire line, and sub networks or network base stations 106*a-e* located at the periphery of the network. For example, cellular user equipment (e.g., any of UE 108*a-m*) communicating with one or more network base stations 106*a-e* may constitute a local sub network. The network connection between any of the network base stations 106*a-e* and the rest of the world may initiate with a link to the backhaul portion of an access provider's communications network 102 (e.g., via a point of presence).

In an embodiment, any of the network controller devices 110-114, and/or network base stations 106*a-e* may have NRC functionality or be considered as an NRC. An NRC may facilitate functions associated with various embodiments of the invention. An NRC is a physical entity that may include software components. In accordance with an embodiment of the invention, an NRC may be a physical device, such as one of network controller devices 110-114 or one of network base stations 106*a-e*. In yet another embodiment, an NRC that performs a particular function of the invention may be a logical software-based entity that can be stored in the volatile or non-volatile memory or memories, or more generally in a non-transitory computer readable medium, of a physical device such as any of network controller devices 110-114 or of network base stations 106*a-e*.

In accordance with various embodiments of the invention, an NRC has presence and functionality that may be defined by the processes it is capable of carrying out. Accordingly, the conceptual entity that is the NRC may be generally defined by its role in performing processes associated with embodiments of the invention. Therefore, depending on the particular embodiment, the NRC entity may be considered to be either a physical device, and/or a software component that is stored in the computer readable media such as volatile or non-volatile memories of one or more communicating device(s) within the networked computing system 100.

In an embodiment of the invention, any of the network controller devices 110-114 and/or network base stations 106*a-e* may function independently or collaboratively to implement processes associated with various embodiments of the invention. Further, any of the processes for auditing and correcting base station antenna configuration may be carried out via any common communications technology known in the Art, such as those associated with modern Global Systems for Mobile (GSM), Universal Mobile Telecommunications System (UMTS), Long Term Evolution (LTE) network infrastructures, etc.

In accordance with a standard GSM network, any of the network controller devices 110-114 (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the network controller devices 110-114 (optionally having NRC functionality) may be associated with a network resource controller (NRC), a serving GPRS support node (SGSN), or any other common network controller device known in the art, such as a radio resource manager (RRM). In accordance with a standard LTE network, any of the network controller devices 110-114 (optionally having NRC functionality) may be associated with an eNodeB base station, a mobility management entity (MME), or any other common network controller device known in the art, such as an RRM.

In a wireless network, the number of UEs attached to a particular base station is a function of the number of active users in the base station's coverage area. If a large number of users are closer to a particular base station than its neighbors, the particular base station may have a larger number of UEs attached to it than its neighbors do, even though some of the UEs are within service range of the neighboring base stations.

In an embodiment, any of the network controller devices 110-114, the network base stations 106*a-e*, as well as any of the UE 108*a-m* may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. In an embodiment of the invention, any of the network controller devices 110-114, or any of the network base stations 106*a-e* may employ any number of common server, desktop, laptop, and personal computing devices.

In an embodiment of the invention, any of the UE 108*a-m* may be associated with any combination of common mobile computing devices (e.g., laptop computers, netbook computers, tablet computers, cellular phones, PDAs, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., network base stations 106*a-e*) typically vary between different service provider networks based on the type of network and the system infrastructure deployed within a particular region of a network (e.g., differences between GSM, UMTS, LTE, LTE Advanced, and WiMAX based networks and the technologies deployed in each network type).

In an embodiment of the invention, any of the network controller devices 110-114, the network base stations 106*a-e*, and UE 108*a-m* may include any standard computing software and hardware necessary for processing, storing, and communicating data between each other within the networked computing system 100. The computing hardware realized by any of the network computing system 100 devices (e.g., any of devices 106*a-e*, 108*a-m*, 110-114) may include: one or more processors, volatile and non-volatile memories, user interfaces, transcoders, modems, wireline and/or wireless communications transceivers, etc. Further, any of the networked computing system 100 devices (e.g., any of devices 106*a-e*, 108*a-m*, 110-114) may include one or more computer readable media encoded with a set of computer readable instructions, which when executed, can perform a portion of the functions associated with various embodiments of the invention.

Figure 2:
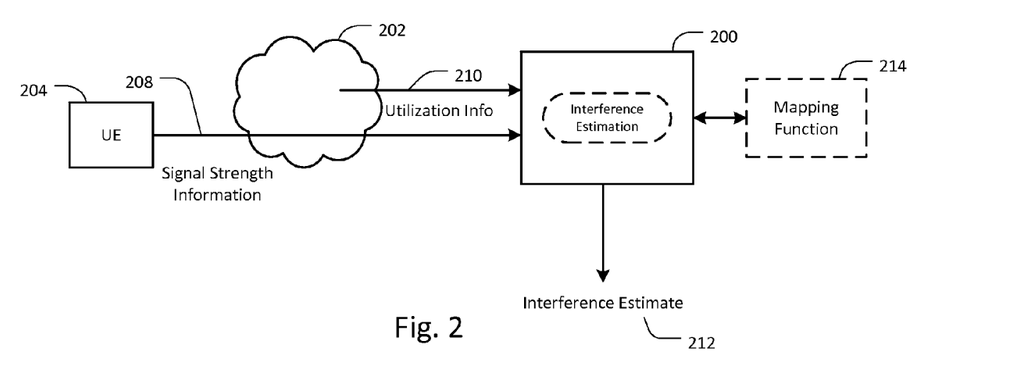
FIG. 2 illustrates a process according to an embodiment of the present invention.

FIG. 2 shows an overview of an interference estimating operation according to an embodiment of the present invention. In particular, FIG. 2 shows a network element 200 configured to receive information from a data communications network 202. A User Equipment (UE) 204 is also in communication with the data communications network.

According to an embodiment, the network element 200 implements the interference estimation function 206 based upon signal strength measurements 208 received from the UE, and also utilization information 210. Based upon application of the estimation interference function to at least these pieces of information 208 and 210, an estimate 212 of interference at the UE from signals from neighboring base stations, is produced. As is described below, certain embodiments may also consider a mapping function 214 in producing the interference estimate. The network element 200 may be the serving base station of the UE, the NRC, or a processor thereof, or the like. In an embodiment, a mobile device may perform the interference estimation and provide the interference estimate to the network element 200.

Figure 3:
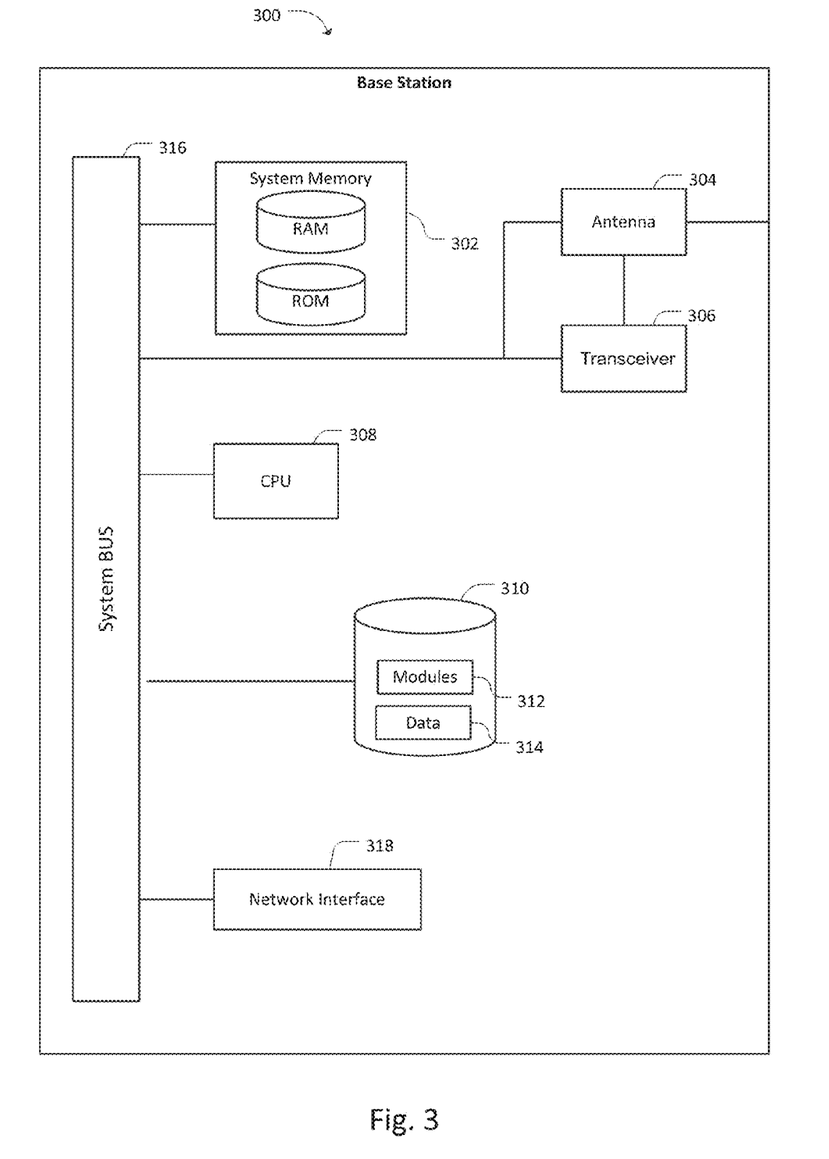
FIG. 3 illustrates a base station according to an embodiment of the present invention.

FIG. 3 illustrates a base station 300 according to embodiments of the present invention. Base station 300 may be any base station 106 shown in FIG. 1.

The network base station 300 may also include one or more data processing devices including a central processing unit (CPU) 308. In an embodiment, CPU 308 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 308 may execute computer programs stored on the network base station's 300 volatile (RAM) and non-volatile (e.g., ROM) system memories 302, or in storage 310.

Storage 310 may comprise volatile or non-volatile memory such as RAM, ROM, a solid state drive (SSD), SDRAM, or other optical, magnetic, or semiconductor memory. In an embodiment, storage 310 includes one or more modules 312 and data 314. Data 314 may be data (e.g., the signal strength information 208 and the utilization information 210) used by embodiments of the present invention. Module 312 may be a software module for performing one or more aspect of processes according to various embodiments, such as to calculate an interference estimate.

The network base station 300 may also include a network interface component 318 that facilitates the network base station's 300 communication with the backhaul or wireless portions of the network computing system 100 of FIG. 1, a transceiver 306 for modulating an analog carrier signal to encode digital information and for demodulating a carrier signal to decode digital information, and a system bus 316 that facilitates data communications between the hardware resources of the network base station 300.

Base station 300 may include at least one antenna 304 for transmitting and receiving wireless communications to and from devices in wireless communication with the base station 300. In an embodiment of the invention, the base station antenna 304 may use any common modulation/encoding scheme known in the art, including, but not limited to Binary Phase Shift Keying, Quadrature Phase Shift Keying, and Quadrature Amplitude Modulation. Additionally, the network base station 300 may be configured to communicate with wireless equipment via any Cellular Data Communications Protocol, including any common LTE, LTE-Advanced, GSM, UMTS, or WiMAX protocol.

Antenna 304 may be associated with a plurality of parameters associated with characteristics of a cell, which may be evaluated and adjusted according to embodiments of the present invention. These parameters include beamwidth, boresight azimuth and downtilt.

Each base station may serve a number of carriers operating on different respective frequencies, and includes a number of antennas which each have a physical coverage area. As used herein, the term "cell" refers to an area served by a single antenna for a given carrier frequency. The coverage area of a cell may relate to the signal strength of a particular carrier signal, such that the boundaries of the cell are defined by points at which the signal strength drops crosses a threshold value, or by points at which the interference rises above a threshold value.

Each cell is served by a given base station, so when UE is described as being attached to a cell, it is also attached to the particular base station 300 associated with the cell. A single base station may serve a plurality of cells, each of which has a separate, and possibly overlapping, coverage area.

Figure 4:
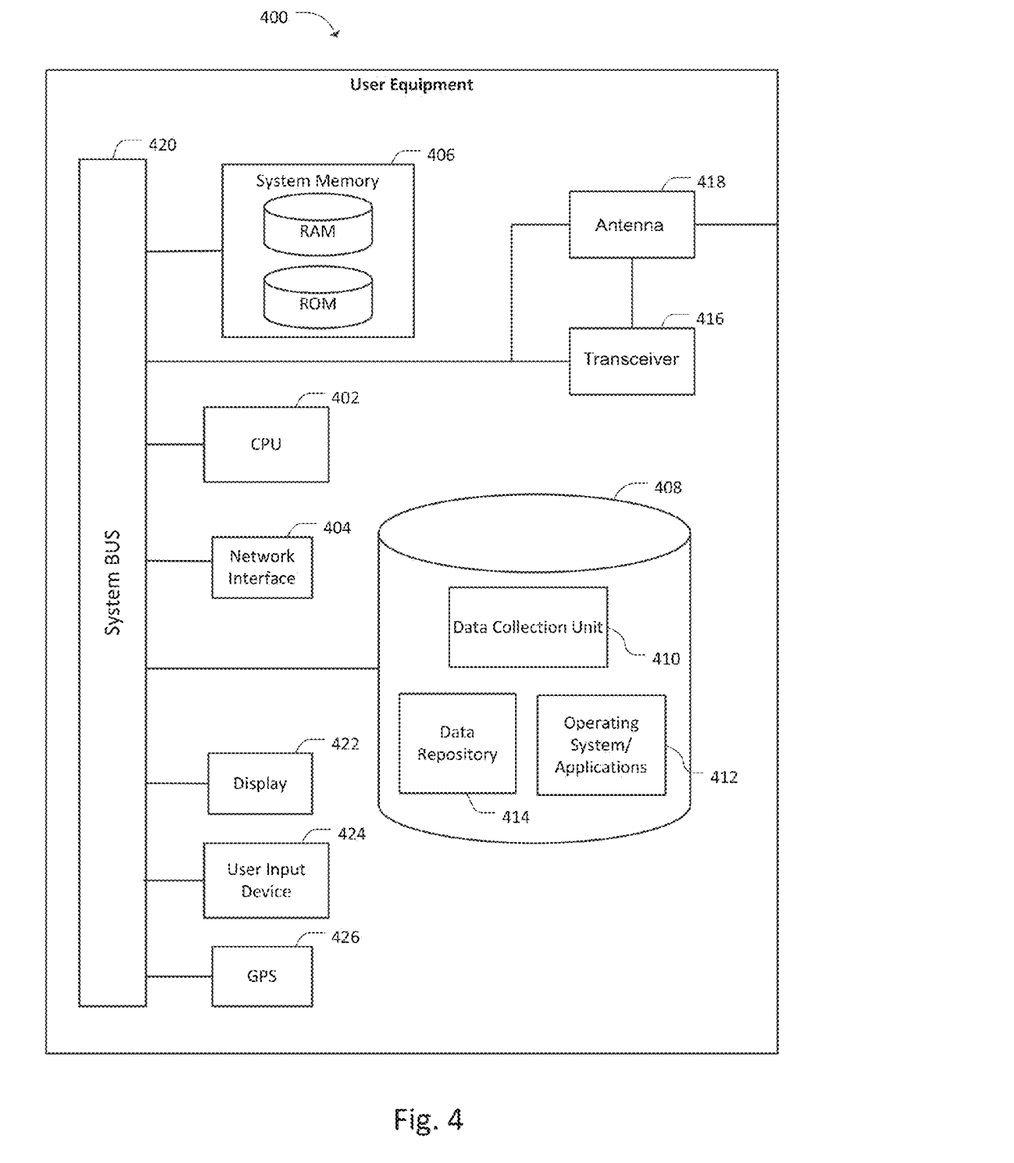
FIG. 4 illustrates user equipment according to an embodiment of the present invention.

FIG. 4 illustrates user equipment (UE) 400 according to an embodiment of the present invention. UE 400 may include one or more data processing device such as central processing unit (CPU) 402. In an embodiment of the invention, the CPU 402 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 402 may be responsible for executing all computer programs stored on the user equipment's 400 volatile (RAM) and non-volatile (e.g., ROM) system memories 406 and storage 408.

UE 400 may also include a network interface component 404 that can facilitate communication between UE 400 and locally connected computing devices (e.g., a Personal Computer), a transceiver 416 for modulating an analog carrier signal to encode digital information and for demodulating a carrier signal to decode digital information, a antenna 418 for transmitting and receiving wireless communications to and from a base station, a system bus 420 that facilitates data communications between hardware resources of UE 400, display unit 422 for displaying text or graphics information, a user input device 424 such as a keyboard, mouse, or touchscreen, GPS unit 426, and a storage 408. Storage 408 may include a data collection unit 410, an operating system/applications repository 412, and a data repository 414 storing various user equipment data.

Figure 5:
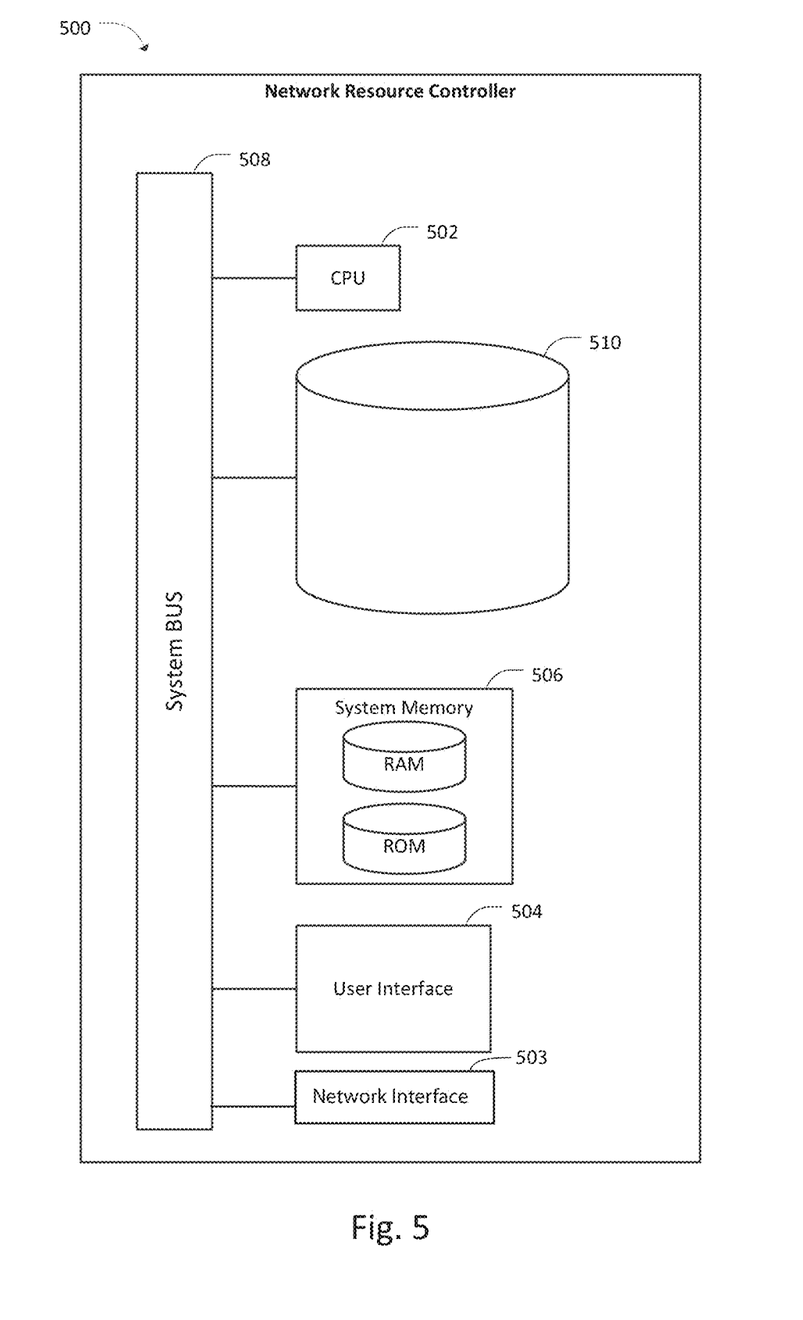
FIG. 5 illustrates a network resource controller according to an embodiment of the present invention.

FIG. 5 shows a Network Resource Controller (NRC) 500 according to an embodiment of the present invention. In accordance with an embodiment of the invention, NRC 500 may be associated with any common base station or network controller device known in the Art, such as an LTE eNodeB (optionally comprising a wireless modem), RRM, MME, RNC, SGSN, BSC, MSC, etc. In an embodiment, NRC 500 is a Self-Organizing Network (SON) server.

NRC 500 may include one or more data processing devices including a CPU 502. In an embodiment, CPU 502 may include an arithmetic logic unit (ALU, not shown) that performs arithmetic and logical operations and one or more control units (CUs, not shown) that extract instructions and stored content from memory and then execute and/or processes them, calling on the ALU when necessary during program execution. CPU 502 may be responsible for executing all computer programs stored on the NRC's 500 volatile (RAM) and non-volatile (e.g., ROM) system memories 506 and storage 510.

System memory 506 may comprise volatile or non-volatile memory such as RAM, ROM, a solid state drive (SSD), SDRAM, or other optical, magnetic, or semiconductor memory.

NRC 500 may include a network interface 503 that can facilitate the NRC's 500 communication with the backhaul portion or the wireless portions of network computing system 100 of FIG. 1. An optional user interface component 504 may be provided to facilitate accessing of NRC's 500 hardware and/or software resources by user or network administrator.

NRC 500 may also include a system bus 512 that facilitates data communications between hardware resources of NRC 500.

Figure 6:
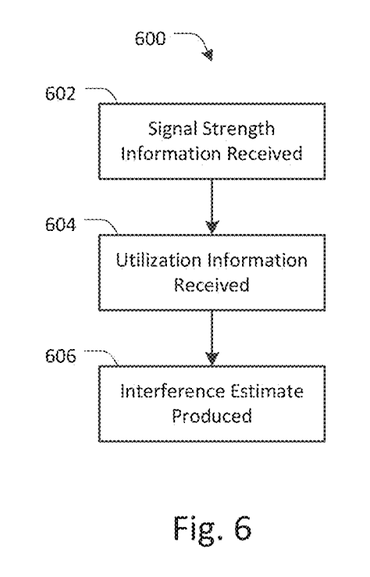
FIG. 6 illustrates a process for interference estimation according to an embodiment.

FIG. 6 shows a process 600 for interference estimation according to an embodiment of the present invention. The process 600 in FIG. 6 is presented as a general overview to illustrate how an operator may implement various aspects of the present invention to estimate interference in a cellular network.

At 602, a network element receives from a user equipment, first information indicating a strength of a signal received at the user equipment from an interfering base station. The network element may be the serving base station of the user equipment, the NRC, or the like. At 604, the network element receives receive second information indicating a utilization of the interfering base station. At 606, the processor processes the first information and the second information according to an estimation function to produce an interference estimate.

Figure 7:
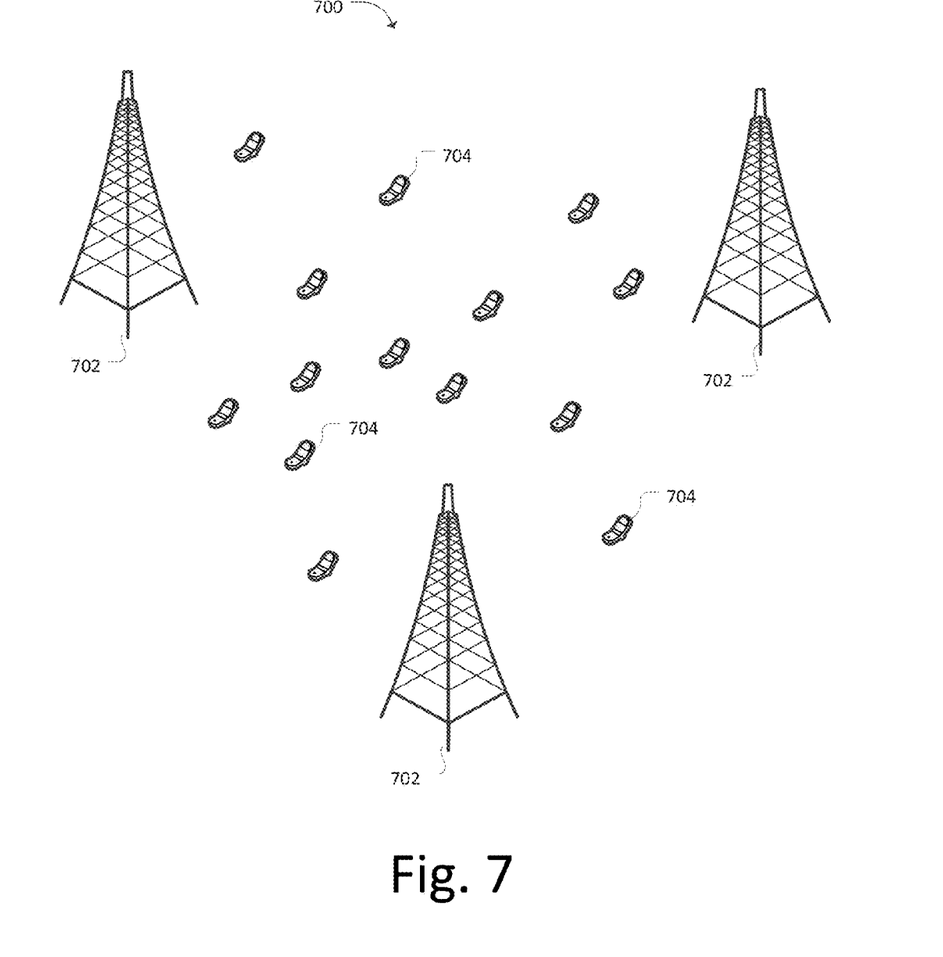
FIG. 7 shows a simplified view of a cellular radio network.

FIG. 7 shows a cellular radio network 700 comprising multiple cellular base stations 702 and mobile devices 704. Each of the mobile devices is in radio communication with one of the cellular base stations, known as its serving base station. At the same time, radio signals from other base stations in the network can cause interference with the signals that each mobile device is receiving from its serving base station.

Mobile devices may measure the total amount of interference seen from transmissions arriving from the serving base station and multiple interfering base stations. However, mobile devices may not be able to distinguish the amount of interference seen from an individual interfering base station. Most cellular wireless protocols provide a way for a mobile device to measure the strength of certain signals received from its serving base station, as well as measure the signal strength of these same signals received from the interfering base stations. For example in the 3GPP LTE protocol, mobile devices, known as User Equipment (UE), can be instructed to measure the strength of the Reference Signals (RS) received at the UE that are transmitted by the serving LTE base station. Base stations are sometimes referred to as enhanced Nodes B (eNodeBs) in LTE. In 3GPP UMTS networks, UEs can measure the signal strength of pilot signals and report these measurements to their serving base stations as Reference Signal Code Power (RSCP) measurements.

The LTE reference signals are transmitted periodically from each eNodeB, e.g., several times per millisecond. They are coded in such a way that even if reference signals are received at the same time at a UE from multiple eNodeBs operating on the same frequency channel, the UE can still make and report independent signal strength measurements for the reference signals from the eNodeBs.

LTE UEs can report the reference signal received power (RSRP) to their serving eNodeBs through a radio resource control (RRC) measurement results report. This report contains the RSRP measurement for the reference signals received from the serving eNodeB as well as the base station ID and RSRP measurement for the reference signals received from interfering eNodeBs. When a UE is receiving interference from an eNodeB, the serving eNodeB and the interfering eNodeB are referred to as neighbor eNodeBs.

The RSRP measurements provide an indication of the maximum levels of interference that an interfering eNodeB can cause to a given UE. This maximum level of interference occurs when the interfering eNodeB is transmitting on all its airlink resources—i.e., with an airlink utilization of 100% utilization. An eNodeB is at 100% airlink utilization when it is transmitting on all available radio resources.

If the interfering eNodeB is transmitting at less than 100% airlink utilization, then the average level of interference that the UE sees from the eNodeB will be less, although the instantaneous levels of interference can change depending on whether or not the interfering base station is transmitting on a given resource at a particular time. For example, if the interfering eNodeB is not transmitting (i.e., it's airlink percentage utilization is 0%), then it is not causing any interference.

In order for the serving base station to have a better estimate of the average levels of interference that a mobile device is receiving from neighboring base stations, it is useful to have information about the percentage utilization of the airlink resources by each of the interfering base stations. This information can be collected at the interfering base stations. Each base station can keep a record of the number of radio resources it utilizes. However the channel utilization of a given interfering base station is generally not known by either the mobile device receiving the interference, or by the serving base station.

In order for the serving base stations to make more accurate estimates of the severity of the interference that interfering base stations are causing to a single mobile device, or across all mobile devices to which they are providing service, the serving base station would need access to the information about the percentage utilization of the airlink resources by each of the interfering base stations.

Figure 8:
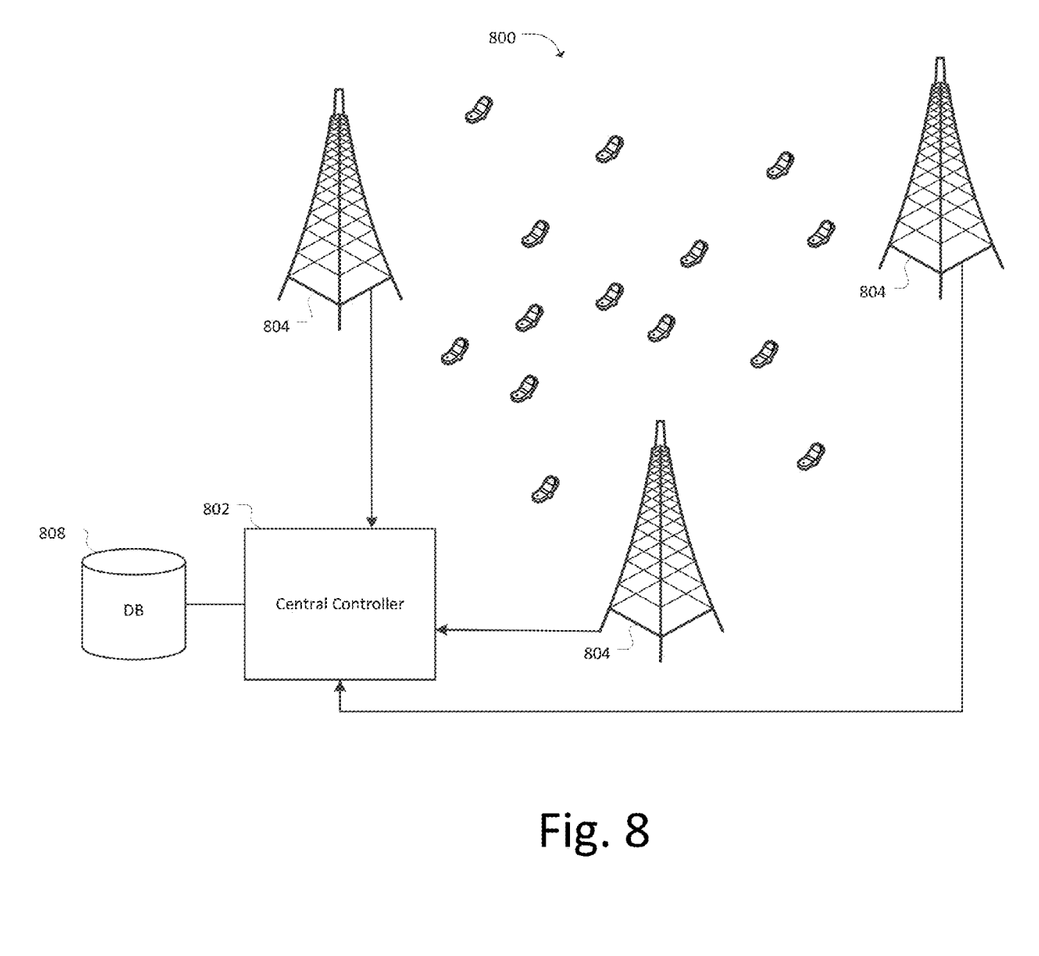
FIG. 8 is a simplified view showing a central controller sharing airlink utilization information.

One way in which the airlink percentage utilization information can be shared among base stations is via a central controller, as shown in FIG. 8.

In the FIG. 8, a central controller 802, e.g., a NRC, periodically collects airlink utilization information (i.e., the fraction or percentage of the airlink radio resources on which a base station has utilized for transmissions) from each base station 804 in the network 806. The base stations can be configured to either periodically send this information to the central controller, or the central controller can poll each base station for the information. The central controller also maintains a database 808 about which base stations are neighbors of each other. This information can be statically provisioned into the central controller, or gathered from the mobile device measurement reports, or pushed to the central controller by an external management system, or in some other manner.

The airlink utilization information provided by the base stations to the central controller can be an average of measurements made over a pre-defined period of time (e.g., 100 ms, 1 second, etc.), a running average of such measurements or other statistical measure of the utilization (e.g., $95^{th}$ percentile), etc.

Once the central controller gathers the airlink percentage utilization information from each base station, it then sends the information to the neighbors of each base station. The neighbors can then use this information to make estimates of the potential levels of interference that each mobile device sees from each of its neighbors.

Figure 9:
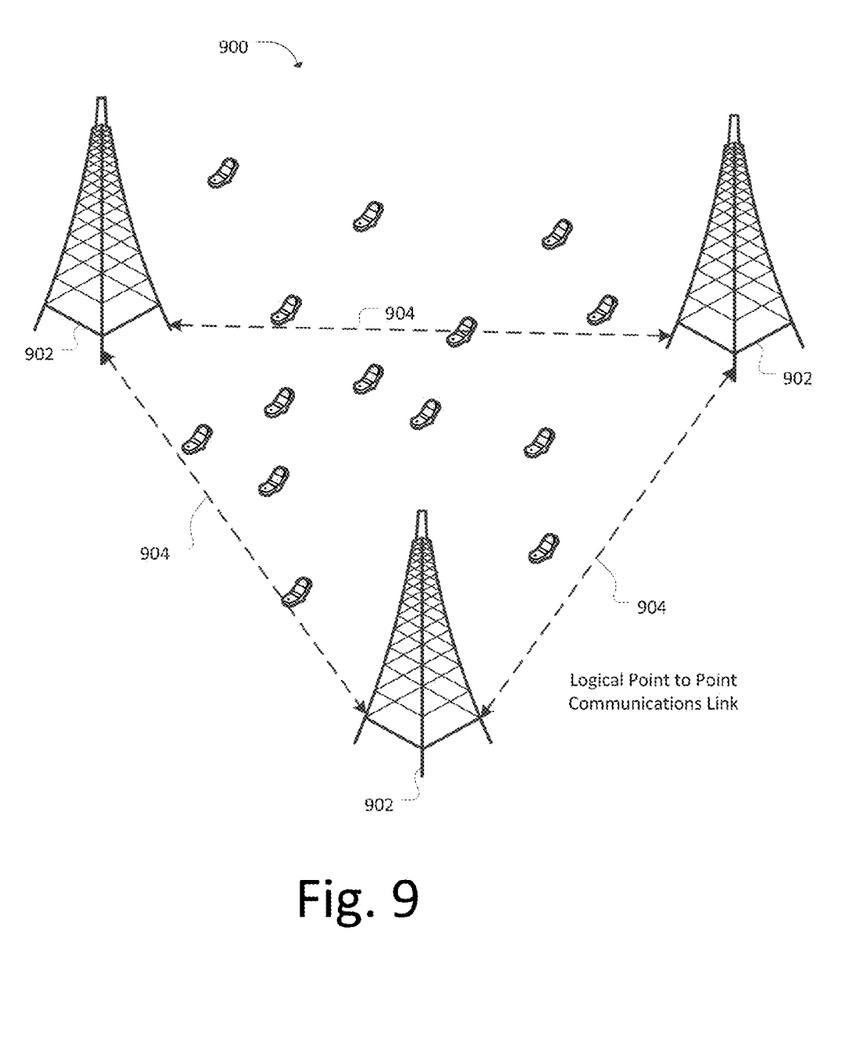
FIG. 9 is a simplified view showing direct exchange of airlink utilization information.

FIG. 9 shows an alternate topology 900 via which the airlink percentage utilization information at each base station can be shared directly with its neighbors.

In FIG. 9, each base station 902 establishes a logical point to point communications link 904 with each of its neighbors. Information on which base stations are its neighbors can be obtained from a central management device, e.g., a NRC, accessible by all base stations, or from the UE reports. The point to point communications link is a logical link that can be established over differing physical link topologies. An example of such a logical point to point communications link is the X2 interface defined in the 3GPP LTE standards.

Each base station periodically sends its airlink percentage utilization information over the logical point to point communications link to each of its neighbor base stations. Each base station can then use the information it receives from its neighbors to make estimates of the potential levels of interference that each mobile device sees from each of its neighbors.

When a serving base station has knowledge of both the percentage airlink channel utilization of neighboring base stations, and the serving and interference base station reference signal power measurements from a mobile device, it can use this information to determine an effective interference level from the neighbor base station. The effective interference level is the RSRP signal level that would be received from an interfering base station transmitting on all its radio resources that would result in the same link performance as the actual interfering signal.

For example, assume that the RSRP level from an interfering base station is 10 dB less than the level from a serving base station and that the interfering base station only transmits on 10% of its radio resources. This results in a certain link performance (e.g., data throughput) between the serving base station and the mobile device. If the serving base station were transmitting at 100% radio resource utilization, then the interference level from the interfering base station would have to be lower (say 20 dB less than the level from the serving base station) in order to achieve the same link performance between the serving base station and the mobile device.

Generically, a function that that calculates an effective interference level from the interfering base station reference signal received power and interfering base station airlink utilization takes the form:

$$\text{Interference}_{\textit{effective}} = f_1(\text{Interference}_{\textit{reference}}, \text{AirlinkUtilization}) \quad \text{Eq. 1}$$

One family of such functions take the form of multiplying the reference interference signal power by a function of the interfering base station airlink utilization.

$$\text{Interference}_{\textit{effective}} = \text{Interference}_{\textit{reference}} * f_2(\text{AirlinkUtilization}) \quad \text{Eq. 2}$$

A simple example function, $f_2$, is where $f_2$ is just the channel utilization itself:

$$f_2(\text{AirlinkUtilization}) = \text{AirlinkUtilization} \quad \text{Eq. 3}$$

As an example, if the interfering base station channel utilization is 50% then the interfering reference signal power is multiplied by 50%, indicating that the average interference power is half of the interfering base station reference signal received power. If the channel utilization is 10% then the average interference is one tenth of the interfering base station reference signal receive power, etc.

Depending on the airlink protocol used, the impact on mobile device receive performance of an interfering base station transmitting at 100% utilization with a given reference signal level is not necessarily the same as, for example, the same interfering base station with twice the reference interference level, but transmitting at 50% utilization.

As an example, assume that the reference signal power received at a mobile station from a serving base station is 6 dB greater than the reference signal power received from an interfering base station. In this case, when the interfering base station is transmitting on all its radio resources, the signal to interference ratio seen for transmissions from the serving base station is 6 dB. When the serving base station transmits data to the mobile device, it will choose an appropriate transmission rate that is compatible with a signal to interference ratio of 6 dB If the interfering base station reference signal received power level drops by 3 dB to 9 dB and the interfering base station airlink utilization remains at 100%, then a higher transmission rate can be used, since the signal to interference ratio has improved.

Now, if the interfering base station reference signal power level remains 6 dB less than the serving base station reference signal power level, but the interfering base station airlink utilization drops to 50%, the average rate at which data is sent to the mobile station may or may not be the same as in the previous case. The average interference level in both cases is the same, but due to the different dynamics of the interference, the link performance may not be the same in both cases.

One way to derive a mapping function for determining equivalent interference levels for a variety of interfering base station airlink utilization levels is to perform link or network simulations that measure the performance between a base station and mobile device and vary the numbers and signal levels of interfering base stations. Through such simulations, the effective interference power can be determined for different neighbor percentage utilizations. This then leads to alternate mapping functions that can map the measured interference level and reported airlink percentage utilization to an effective interference level.

While the effective interference level estimation may take place on a serving base station, these calculations can also be performed on other nodes in the network that have all the required information. For example, these calculations could be performed at the mobile device if it is sent the neighbor base station airlink utilization information. Alternately, these calculations could be performed at a central node that has been sent the reference signal power level measurements from a mobile device and the airlink utilization measurements from the interfering base stations.

In contrast to prior 3GPP air interface standards, which use a fixed channel bandwidth for all base stations, the LTE standard supports the use of different frequency channel bandwidths at each eNodeB. If a serving eNodeB and an eNodeB causing interference have different channel bandwidths, but some or all of the channels overlap in frequency, then the above methods for determining an equivalent interference power can still be applied to the overlapping portion of the serving and interfering eNodeB channels.

Only the resources between the serving eNodeB and interfering eNodeB that overlap in frequency will have interference. The DL resources from the serving eNodeB that don't overlap in frequency with the DL resources from the interfering eNodeB will not have any interference. For the overlapping resources, the equivalent interference estimate as outlined in the document still applies. For the other resources, they will not have interference from the interfering base station.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

What is claimed is:
1. A system for estimating interference on a cellular network, the system comprising:
   a processor; and
   a non-transitory computer readable medium with computer executable instructions stored thereon which, when executed by the processor, perform the following method:

causing the processor to receive from a user equipment, first information indicating a strength of a signal received at the user equipment from an interfering base station;

causing the processor to receive second information indicating an airlink utilization of the interfering base station; and causing the processor to process the first information and the second information according to an estimation function to produce an interference estimate, wherein the airlink utilization is a percentage of resources that the interfering base station uses over a predetermined time period of one second or less.

2. The system of claim 1, wherein the processor is located in a serving base station of the user equipment.

3. The system of claim 1, wherein:
the processor is located in the user equipment; and
the method further comprises causing the processor to communicate the interference estimate to a serving base station of the user equipment.

4. The system of claim 1, wherein:
the processor is located in a network resource controller; and
the method further comprises causing the processor to communicate the interference estimate to a serving base station of the user equipment.

5. The system of claim 1, wherein the second information is received from a network resource controller.

6. The system of claim 1, wherein the second information is received from the interfering base station.

7. The system of claim 1, wherein the processor is caused to process the first information and the second information to produce the interference estimate, further based upon a mapping function.

8. The system of claim 1, wherein the first information includes an RSRP (Reference Signal Received Power) value.

9. A method for estimating interference, the method comprising:
receiving from a user equipment, first information indicating a strength of a signal received at the user equipment from an interfering base station;
receiving second information indicating an airlink utilization of the interfering base station; and
processing the first information and the second information according to an estimation function to produce an interference estimate,
wherein the airlink utilization is a percentage of resources that the interfering base station uses over a predetermined time period of one second or less.

10. The method of claim 9, wherein the interference estimate is produced in a serving base station of the user equipment.

11. The method of claim 9, wherein:
the interference estimate is produced in the user equipment; and
the method further comprises causing the user equipment to communicate the interference estimate to a serving base station of the user equipment.

12. The method of claim 9, wherein:
the interference estimate is produced in a network resource controller; and
the method further comprises causing the network resource controller to communicate the interference estimate to a serving base station of the user equipment.

13. The method of claim 9, wherein the second information is received from a network resource controller.

14. The method of claim 9, wherein the second information is received from the interfering base station.

15. The method of claim 9, wherein processing the first information and the second information to produce the interference estimate is further based upon a mapping function.

16. A non-transitory computer readable medium with computer executable instructions stored thereon which, when executed by the processor, perform the following method:
receiving from a user equipment, first information indicating a strength of a signal received at the user equipment from an interfering base station;
receiving second information indicating an airlink utilization of the interfering base station; and
processing the first information and the second information according to an estimation function to produce an interference estimate,
wherein the airlink utilization is a percentage of resources that the interfering base station uses over a predetermined time period of one second or less.

17. The non-transitory computer readable medium of claim 16, wherein the interference estimate is produced in a serving base station of the user equipment.

18. The non-transitory computer readable medium of claim 16, wherein:
the interference estimate is produced in the user equipment; and
the method further comprises causing the user equipment to communicate the interference estimate to a serving base station of the user equipment.

19. The non-transitory computer readable medium of claim 16, wherein:
the interference estimate is produced in a network resource controller; and
the method further comprises causing the network resource controller to communicate the interference estimate to a serving base station of the user equipment.

20. The non-transitory computer readable medium of claim 16, wherein the second information is received from a network resource controller.

21. The non-transitory computer readable medium of claim 16, wherein the second information is received from the interfering base station.

* * * * *